(12) United States Patent
Krauss

(10) Patent No.: US 7,657,792 B2
(45) Date of Patent: Feb. 2, 2010

(54) IDENTIFYING RACE CONDITIONS INVOLVING ASYNCHRONOUS MEMORY UPDATES

(75) Inventor: Kirk J. Krauss, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 419 days.

(21) Appl. No.: 11/616,910

(22) Filed: Dec. 28, 2006

(65) Prior Publication Data

US 2008/0162776 A1 Jul. 3, 2008

(51) Int. Cl.
*G06F 11/00* (2006.01)
(52) U.S. Cl. .......................... 714/38; 714/720
(58) Field of Classification Search ............ None
See application file for complete search history.

(56) References Cited

U.S. PATENT DOCUMENTS

| | | | |
|---|---|---|---|
| 5,367,639 A | 11/1994 | Sodos | |
| 5,710,881 A | 1/1998 | Gupta et al. | |
| 5,893,153 A | 4/1999 | Tzeng et al. | |
| 6,199,121 B1 | 3/2001 | Olson et al. | |
| 7,231,498 B2 * | 6/2007 | Rodeheffer et al. | 711/150 |
| 2003/0056149 A1 | 3/2003 | Hue | |
| 2005/0038806 A1 | 2/2005 | Ma | |
| 2006/0123216 A1 * | 6/2006 | Krauss et al. | 711/171 |
| 2006/0200823 A1 * | 9/2006 | Rodeheffer et al. | 718/100 |
| 2007/0150879 A1 * | 6/2007 | Rangarajan et al. | 717/154 |
| 2007/0192550 A1 * | 8/2007 | Rodeheffer et al. | 711/154 |
| 2008/0244332 A1 * | 10/2008 | Edwards et al. | 714/48 |
| 2009/0049545 A1 * | 2/2009 | Nagpal et al. | 726/22 |

* cited by examiner

*Primary Examiner*—Christopher S McCarthy
(74) *Attorney, Agent, or Firm*—Cuenot, Forsythe & Kim, LLC

(57) ABSTRACT

A method of identifying race conditions in a computer program can include identifying a call to a selected function specifying a memory range. The selected function can cause data to be written to the memory range asynchronously. The method further can include spraying the memory range with a predetermined bit pattern and determining whether a detected write operation at least partially overwrites the predetermined bit pattern in the memory range. A race condition can be selectively indicated according to the determining step.

17 Claims, 2 Drawing Sheets

IDENTIFYING RACE CONDITIONS INVOLVING ASYNCHRONOUS MEMORY UPDATES

BACKGROUND OF THE INVENTION

Runtime analysis tools are commonly used in software development to evaluate the behavior of computer programs. Runtime analysis refers to the practice of understanding computer program behavior using data collected during execution of a computer program. Typically, the computer program is instrumented using the runtime analysis tool. The runtime analysis tool inserts additional code within the computer program, referred to as the computer program under test. This additional code can perform various monitoring tasks and reporting functions that may or may not work cooperatively with the runtime analysis tool itself.

Some functions, for example, operating system functions involving device drivers, can cause an overlapped input/output (I/O) condition to occur. Overlapped I/O refers to the situation in which a range of memory is updated asynchronously. In illustration, a computer program can call a function causing an overlapped I/O condition. The computer program can continue to execute while an I/O request initiated by the called function remains pending. At some point, the I/O request is filled and the memory range is written, albeit not immediately responsive to the function being called by the computer program.

In some cases, the computer program inadvertently accesses the memory range prior to the I/O request being filled. Typically, this situation, referred to as a "race condition", occurs as a result of faulty wait logic in the computer program. The computer program reuses the memory range for another purpose or uses incorrect data, i.e., data read from the memory range before the proper data is written through fulfillment of the I/O request. In any case, a race condition can result in erratic computer program behavior including faults or crashes.

BRIEF SUMMARY OF THE INVENTION

The present invention relates to a method of identifying a race condition in a computer program. The method can include identifying a call to a selected function specifying a memory range. The selected function can cause data to be written to the memory range asynchronously. The method further can include spraying the memory range with a predetermined bit pattern and determining whether a detected write operation at least partially overwrites the predetermined bit pattern in the memory range. A race condition can be selectively indicated according to the determining step.

The present invention also relates to a method of identifying a race condition in a computer program including tagging a memory range that will be asynchronously updated and spraying the memory range with a predetermined bit pattern. The method further can include detecting a write operation to the memory range that is initiated by the computer program that at least partially modifies the predetermined bit pattern and, responsive to detecting the write operation, indicating an occurrence of a race condition for the memory range.

The present invention also relates to a computer program product including a computer-usable medium having computer-usable program code that, when executed by an information processing system, performs the various steps and/or functions described herein.

DETAILED DESCRIPTION OF THE INVENTION

Figure 1:
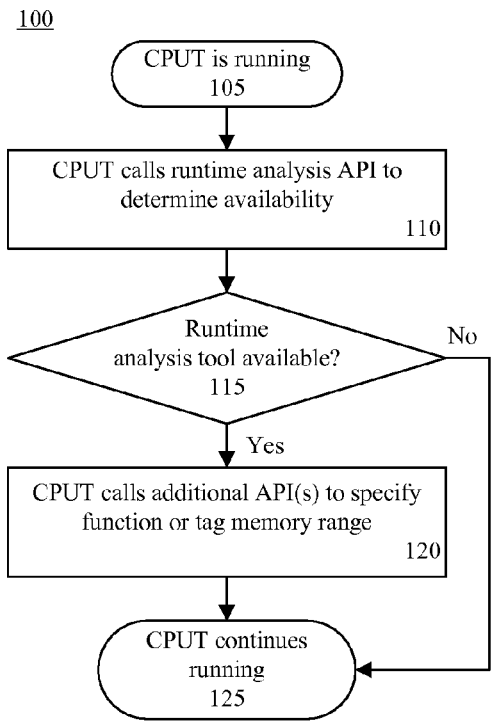
FIG. 1 is a flow chart illustrating a method in accordance with one aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to detecting and indicating race conditions that involve asynchronous memory updates. Particular functions, when called, cause I/O requests to remain pending for an amount of time. During that time, the computer program continues to execute. If the computer program accesses the memory range that is to be updated by the pending I/O request prior to the request being fulfilled, a race condition can be indicated. The offending code of the computer program further can be identified. As used herein, a "memory range" or "range of memory" can refer to a portion of memory, within a committed virtual memory page or region, that is specified to a function that performs overlapped I/O.

The embodiments disclosed herein can be implemented using a runtime analysis tool that can instrument a computer program with code for monitoring and detecting the behaviors described herein. The runtime analysis tool can compile the computer program and insert the monitoring code to produce an instrumented computer program, referred to as the "computer program under test" (CPUT). One example of a runtime analysis tool that can be used to implement the various functions described herein is Rational® PurifyPlus™ from International Business Machines Corporation of Armonk, N.Y., (IBM®). Rational® PurifyPlus™ is an example of a runtime analysis tool capable of instrumenting code and functioning cooperatively with the instrumented computer program during execution. (IBM, Rational, and PurifyPlus are trademarks of International Business Machines Corporation in the United States, other countries, or both).

Those skilled in the art will recognize that the products discussed within this specification are intended to provide a basis for teaching one skilled in the art to better understand the embodiments disclosed herein. The mention of a particular product, however, is not intended to limit the present invention in any way. For example, the embodiments disclosed herein can be implemented as a standalone application, as a component or "plug-in" that is used as part of a larger application, or in virtually any appropriately detailed structure, computer program, and/or portion thereof.

As noted, the runtime analysis tool can instrument the computer program and insert analysis code resulting in the instrumented CPUT. In one embodiment, the CPUT can execute in conjunction with the runtime analysis tool such that the two function cooperatively to perform the various functions described herein. In another embodiment, the CPUT can execute independently without the runtime analysis tool running concurrently. In either case, for ease of reference, it can be said that the runtime analysis tool or the CPUT "performs" the various steps described herein, whether or not the runtime analysis tool is executing concurrently with the CPUT.

In one aspect, the runtime analysis tool can instrument a computer program with code that detects when the CPUT invokes various functions that cause asynchronous updating of memory ranges. Functions that can cause overlapped I/O to occur can include, but are not limited to, device drivers, functions that write codes to device drivers, also called "device driver accessors", as well as selected user-specified functions. Within a Windows® type of operating system, functions such as "DeviceIoControl" and "GetOverlappedResult" are examples of functions that cause overlapped I/O to occur. Other functions performed by the CPUT or runtime analysis tool, as will be described herein in further detail, can include monitoring memory ranges that will be asynchronously updated and intercepting write operations.

In another embodiment, a computer program can be written in a manner that includes monitoring code enabling the computer program to perform the various functions disclosed herein. In that case, the computer program can be developed or written from the ground up to include the necessary programming to perform the functions disclosed herein without instrumentation after the fact.

Within this specification, particular reference is made to functions such as "DeviceIoControl" and "GetOverlappedResult". These functions have been provided for purposes of illustration only and, as such, are not intended to limit the present invention to one particular type of operating system. Those skilled in the art will recognize that the present invention can be implemented on, or extended to, any of a variety of different operating systems and that the particular functions that cause asynchronous updating of memory ranges will change from one operating system to another, as will the particular write operations that can be intercepted.

FIG. 1 is a flow chart illustrating a method 100 in accordance with one aspect of the present invention. More particularly, FIG. 1 illustrates an aspect of the present invention that allows a user to specify one or more functions that cause a memory range to be asynchronously updated. As noted, various operating system functions are known to cause overlapped I/O conditions. The flow chart of FIG. 1 provides a user with a process for indicating additional user-specified functions to the runtime analysis tool that also cause overlapped I/O conditions and a process for designating particular memory ranges to be tracked.

In general, the user or developer of a computer program can insert one or more calls to various application programming interfaces (APIs) provided by the runtime analysis tool. Through these APIs, the developer can invoke the various monitoring and detection functions described herein for a user-specified function or memory range as opposed to being limited to a predefined set of asynchronous functions. The method 100 can begin in step 105, where the CPUT is running. As noted, the CPUT can be running on its own or in conjunction with the runtime analysis tool.

In step 110, the CPUT can call an API of the runtime analysis tool to determine whether the runtime analysis tool is available or active. In step 115, the CPUT can make a determination as to whether the CPUT is available based upon one or more arguments returned from the function call of step 110. If the runtime analysis tool is available, the method can proceed to step 120. If not, the method can proceed to step 125.

In step 120, the CPUT can call one or more additional APIs provided by the runtime analysis tool that allow the CPUT to pass identifiers specifying one or more functions that should be designated as causing overlapped I/O conditions. Passing the function names to the runtime analysis tool can cause the runtime analysis tool to add any user-specified function to a list of selected functions. Calls from the CPUT to a selected function will be detected and logged. The runtime analysis tool can detect when the CPUT calls the selected functions, e.g., operating system functions, as well as any user-specified functions.

In another embodiment, the CPUT can access one or more APIs of the runtime analysis tool to indicate one or more memory ranges that are to be tagged or marked as memory ranges that will be asynchronously updated. An API further can be provided which sprays the user designated memory range(s) with a predetermined bit pattern. This allows the developer to specify a memory range to be monitored rather than specifying a selected function. In either case, it should be appreciated that for user-specified functions or memory ranges, the developer can "manually" insert the code and logic into the CPUT that invokes the runtime analysis tool functionality.

In illustration, a developer may wish to track the behavior of particular function, such as an inter-process communication (IPC) triggering function, within the CPUT. Such a function, or a memory range accessed by such a function, can be indicated to the runtime analysis tool using one or more provided APIs as discussed above. An example of such an API can be PurifyMarkAsPending(AddrT address, SizeT len), which can tag a range of memory as being "off limits", or unavailable, and spray a predetermined bit pattern in the range of memory. This function can be called after a function call that can cause memory to be updated non-synchronously. In another example, an API such as PurifyMarkAsNotPending(AddrT address, SizeT len) can be called to un-tag a memory range or indicate that the memory range is no longer off limits. This function can be called before a function call that is expected to update the memory.

In step 125, the CPUT can continue to run. The method 100 can be repeated as may be required to indicate further user-specified functions or memory ranges to be tracked.

Figure 2:
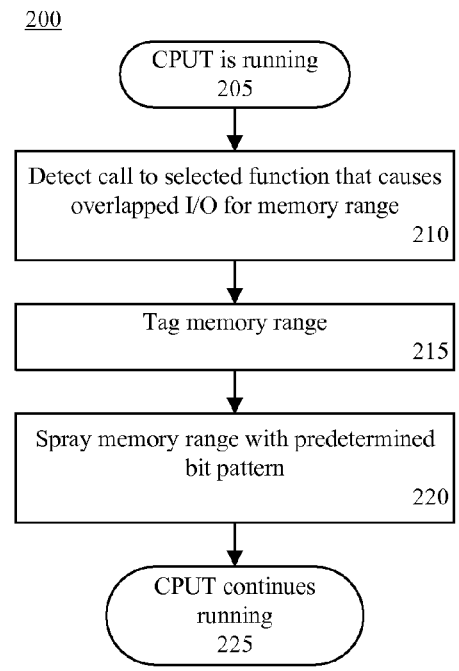
FIG. 2 is a flow chart illustrating a method in accordance with another aspect of the present invention.

FIG. 2 is a flow chart illustrating a method 200 in accordance with another aspect of the present invention. More particularly, FIG. 2 illustrates an aspect of the present invention relating to detecting calls, by the CPUT, to functions that have been identified as causing overlapped I/O conditions to occur. The method 200 can begin in step 205, where the CPUT is running.

In step 210, a call to a selected function that has been identified as causing an overlapped I/O condition to occur can be detected or intercepted. In one embodiment, the selected function can be one that is known to cause asynchronous updating of a memory range. Such functions can include operating system level functions as noted herein. In another embodiment, the selected function can be one that has been identified by a user of the runtime analysis tool described herein.

In step 215, the memory range that is passed to the selected function can be identified and tagged. Typically, such functions are passed arguments that specify pointers or other indicators of a particular memory range that will be updated asynchronously. In step 220, the memory range identified in step 215 can be sprayed, or overwritten, with a predetermined bit pattern. Spraying the memory range with a predetermined bit pattern facilitates monitoring of the memory range to determine when the memory range, or at least a portion of the memory range, has been overwritten. In step 225, the CPUT can continue to run and repeat as may be required to continue detecting calls to selected functions causing asynchronous memory updates.

In another embodiment, rather than independently tagging and spraying memory ranges, the act of spraying the predetermined bit pattern into the memory range can be considered "tagging" the memory range. In that case, a separate tagging process or list of tagged memory ranges need not be maintained as the existence of the predetermined bit pattern within the memory range indicates that the memory range has been tagged.

Figure 3:
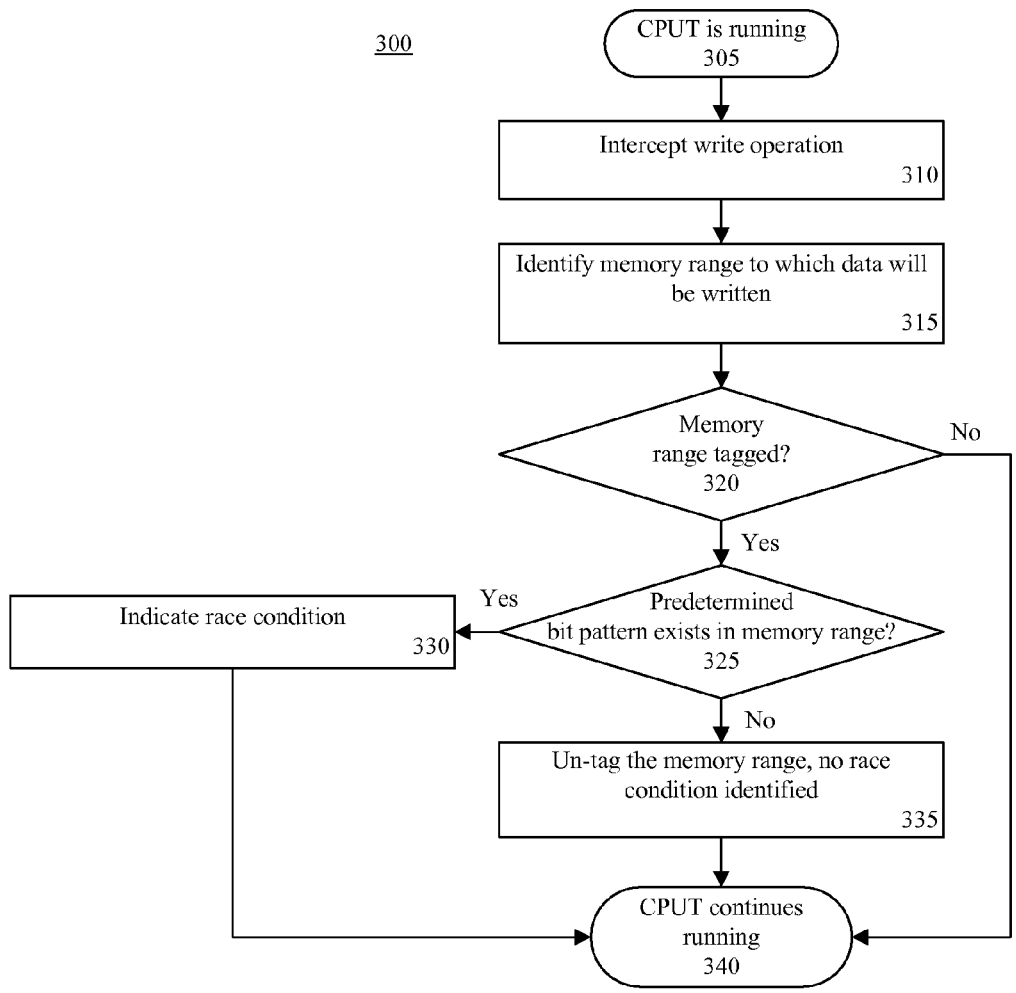
FIG. 3 is a flow chart illustrating a method in accordance with another aspect of the present invention.

FIG. 3 is a flow chart illustrating a method 300 in accordance with another aspect of the present invention. More particularly, FIG. 3 illustrates an aspect of the present invention relating to detecting and indicating race conditions. The method can begin in step 305 where the CPUT is running. In step 310, a write operation can be detected or intercepted. The write operation can be one that is initiated by the CPUT. In step 315, the memory range that is to be written by the write operation can be identified.

In step 320, a determination can be made as to whether the identified memory range has been tagged as a memory range that will be asynchronously updated. It should be appreciated that the memory range may be tagged responsive to a user request or by virtue of the fact that a selected function has been passed a reference to that memory range. In any case, if the memory range is tagged, the method can proceed to step 325. If not, the method can continue to step 340, where the CPUT can continue to execute.

In step 325, a determination can be made as to whether the predetermined bit pattern still exists in the memory range that is to be written by the write operation just prior to the write being performed. If so, the method can proceed to step 330. If not, the method can continue to step 335. It should be appreciated that the memory write intercepted by the runtime analysis tool can involve all or part of the memory range that has been tagged and/or sprayed. That is, if the CPUT writes to any range that is in common with the tagged and/or sprayed memory range, while that memory range contains the predetermined bit pattern, a race condition can be triggered.

The runtime analysis tool can detect when a function that implements asynchronous memory updates is called or invoked. In general, the activity of updating the memory that is subsequently performed responsive to calling the function, however, is not detectable by the runtime analysis tool absent a different type of analysis which delves deeper into the inner workings of the operating system. When a memory range is updated in consequence of an overlapped I/O condition, the runtime analysis tool only determines that the memory range has been updated by the asynchronous function by virtue of the changed contents of the memory range, e.g., the predetermined bit pattern no longer exists or has been altered. The changing of the predetermined bit pattern in a tagged memory range is not associated with a detected write operation of the CPUT.

If, however, the overwriting of the predetermined bit pattern in the memory range, or any portion thereof, occurs as a result of a detectable write operation, e.g., a write operation that is initiated by the CPUT and one that can be detected through the runtime analysis tool or instrumented code, such an event is indicative of a race condition. If the memory range is written prematurely or improperly by the write operation, e.g., not as a consequence of a pending I/O request, a race condition exists.

Accordingly, in step 330, an indication of a race condition can be provided when the write operation overwrites, or attempts to overwrite, the memory range still containing the predetermined bit pattern. After step 330, the method can proceed to step 340 to continue processing. In step 335, since the predetermined bit pattern no longer exists, it can be determined that the memory range has been asynchronously updated. Accordingly, the memory range can be un-tagged as no race condition exists. That is, the memory range was properly updated asynchronously prior to being accessed by the detected write operation.

The runtime analysis tool can create a list of race conditions in which each entry specifies a memory range that was accessed as well as the particular write operation that improperly accessed the memory range. For example, call stack information or other operating parameters of the CPUT can be stored when a write operation is detected that causes a race condition. The information can be reported in any of a variety of different forms, e.g., a list or a report. In another embodiment, an indication of the occurrence of a race condition can be provided as detected during execution of the CPUT.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of identifying race conditions in a computer program comprising:
    identifying a call to a selected function specifying a memory range, wherein the selected function causes data to be written to the memory range asynchronously;
    spraying the memory range with a predetermined bit pattern;
    determining whether a detected write operation at least partially overwrites the predetermined bit pattern in the memory range; and
    selectively indicating a race condition according to the determining step by determining that a race condition has not occurred if the predetermined bit pattern in the memory range is at least partially overwritten as a result of an overlapped input/output condition.

2. The method of claim 1, wherein identifying a call further comprises identifying a call by the computer program to an operating system function that causes overlapped input/output to occur with respect to the memory range.

3. The method of claim 1, wherein identifying a call further comprises identifying a call by the computer program to a user-specified function.

4. The method of claim 3, further comprising receiving an input indicating the user-specified function as the selected function.

5. The method of claim 1, wherein selectively indicating a race condition further comprises indicating a race condition if the predetermined bit pattern written to the memory range is at least partially overwritten by the detected write operation.

6. The method of claim 1, further comprising:
    tagging the memory range; and
    responsive to the predetermined bit pattern being at least partially overwritten as a result of an overlapped input/output condition, un-tagging the memory range.

7. A method of identifying race conditions in a computer program comprising:
   tagging a memory range that will be asynchronously updated and spraying the memory range with a predetermined bit pattern;
   detecting a write operation to the memory range that is initiated by the computer program that at least partially modifies the predetermined bit pattern;
   responsive to detecting the write operation, indicating an occurrence of a race condition for the memory range; and
   un-tagging the memory range when the predetermined bit pattern is at least partially overwritten as a result of an overlapped input/output condition.

8. The method of claim 7, further comprising detecting a call to a selected function that causes overlapped input/output to occur with respect to the memory range.

9. The method of claim 8, further comprising receiving a user input specifying the selected function.

10. The method of claim 7, further comprising receiving a user input specifying the memory range.

11. The method of claim 7, further comprising determining that a race condition has not occurred if the predetermined bit pattern in the memory range is at least partially overwritten as a result of an overlapped input/output condition.

12. A computer program product comprising:
   a computer-readable storage medium having computer-usable program code that identifies race conditions in a computer program, said computer-readable storage medium further including:
   computer-usable program code that identifies a call to a selected function specifying a memory range, wherein the selected function causes data to be written to the memory range asynchronously;
   computer-usable program code that sprays the memory range with a predetermined bit pattern;
   computer-usable program code that determines whether a detected write operation at least partially overwrites the predetermined bit pattern in the memory range; and
   computer-usable program code that selectively indicates a race condition according to the determining step by determining that a race condition has not occurred if the predetermined bit pattern in the memory range is at least partially overwritten as a result of an overlapped input/output condition.

13. The computer program product of claim 12, wherein the computer-usable program code that identifies a call further comprises computer-usable program code that identifies a call by the computer program to an operating system function that causes overlapped input/output to occur with respect to the memory range.

14. The computer program product of claim 12, wherein the computer-usable program code that identifies a call further comprises computer-usable program code that identifies a call by the computer program to a user-specified function.

15. The computer program product of claim 14, further comprising computer-usable program code that receives an input indicating the user-specified function as the selected function.

16. The computer program product of claim 12, wherein the computer-usable program code that selectively indicates a race condition further comprises computer-usable program code that indicates a race condition if the predetermined bit pattern written to the memory range is at least partially overwritten by the detected write operation.

17. The computer program product of claim 12, further comprising:
   computer-usable program code that tags the memory range; and
   computer-usable program code that un-tags the memory range responsive to the predetermined bit pattern being overwritten as a result of an overlapped input/output condition.

* * * * *